3,337,541
5-[2-(5-NITRO-2-FURYL) VINYL]-1,3,4-OXADIAZOLE DERIVATIVES

Raitaro Haraoka and Akira Sugihara, Osaka, and Masumi Ito, Takatsuki, Japan, assignors to Fujisawa Pharmaceutical Co., Ltd., Osaka, Japan, a company of Japan
No Drawing. Filed Dec. 28, 1964, Ser. No. 421,591
3 Claims. (Cl. 260—240)

This invention relates to new and useful 5-[2-(5-nitro-2-furyl) vinyl]-1,3,4-oxadiazole derivatives represented as follows (I):

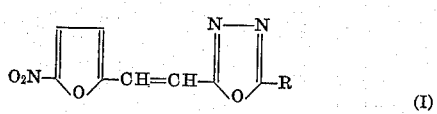

wherein R is a radical selected from the group consisting of lower alkoxy, lower alkoxy lower alkyl, lower alkoxyphenyl and furan.

The compounds (I) of this invention may be prepared by heating in the presence of a dehydrating agent, of 1-[3-(5-nitro-2-furyl) acryloyl]-hydrazine derivative having the general Formula II.

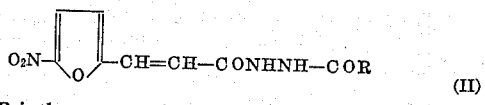

wherein R is the same as that mentioned above.

The starting compounds (II) to be used in the above reaction can be obtained by the reaction of 3-(5-nitro-2-furyl) acrylic acid or its reactive derivative with acylhydrazine derivative having the formula of $$NH_2NH—COR$$

wherein R is the same as that mentioned above, or by the reaction of 3-(5-nitro-2-furyl) acryloyl hydrazine obtained from 3-(5-nitro-2-furyl) acrylic acid or its reactive derivative and hydrazine with an acylating agent.

Thus obtained compound (II) is heated in the presence of a dehydrating agent with or without an organic solvent.

As the dehydrating agent may be mentioned phosphorus oxychloride, phosphorus oxybromide, chlorosulfonic acid, a mixture of thionylchloride and pyridine, phosphorus pentaoxide, zinc chloride polyphosphoric acid, dicyclohexylcarbodiimide and so forth.

Examples of the organic solvent to be preferably used are toluene, xylene, ligroin, dioxane, etc. which are inert in the reaction and have comparatively high boiling points. The dehydrating agents in liquid can also act as the solvent. The reaction is preferably carried out at a temperature of 80° C. to 150° C., but the reaction temperature is not particularly limited.

The compounds (I) may also be prepared by reacting 5-nitro-2-furaldehyde with 2-methyl-1,3,4-oxadiazole derivative having the general formula

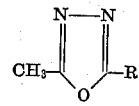

wherein R is the same as that mentioned above, in the presence of acetic anhydride under heating. In this reaction, a large amount of acetic anhydride is usually used serving both as a solvent and a condensing agent, and the yield of the object compound may go up by the addition of a salt of strong acid such as zinc chloride. Furthermore, the compounds (I) may be prepared by reacting 5-substituted 2-[2-(5-nitro-2-furyl) vinyl]-1,3,4-oxadiazole obtained from 2-furaldehyde, and 2-methyl-1,3,4-oxadiazole derivative having the general formula

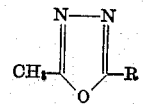

wherein R is the same as that mentioned above, with acetyl nitrate or diacetyl orthonitrate at low temperature.

The compounds (I) thus obtained exhibit a high order of activity against a variety of micro-organisms including both Gram-positive and Gram-negative bacteria and protozoa such as *Trichomonas vaginalis*. Such activity is measured by the serial dilution commonly employed in testing antimicrobial substances. The following table shows the results of such testing of a few compounds of this invention, namely (A) 5-[-2-(5-nitro-2-furyl) vinyl]-2-ethoxy-1,3,4-oxadiazole.
(B) 5-[2-(5-nitro-2-furyl) vinyl]-2-methoxymethyl-1,3,4-oxadiazole.
(C) 5-[2-(5-nitro-2-furyl) vinyl]-2-(4-methoxyphenyl)-1,3,4-oxadiazole.
(D) 5-[2-(5-nitro-2-furyl) vinyl]-2-(2-furyl)1,3,4-oxadiazole.

| Species | Minimum Inhibitory Concentration (meg./ml.) | | | |
|---|---|---|---|---|
| | (A) | (B) | (C) | (D) |
| *Escherichia coli* | 2.5 | 20 | | |
| *Staphylococcus aureus* | 40 | | | |
| *Trichomonas vaginalis* | 1 | 2.5 | 5 | 2.5 |

This invention is illustrated by the following non-limitative examples.

*Example 1.—5-[2-(5-nitro-2-furyl) vinyl]-2-ethoxy-1,3,4-oxadiazole*

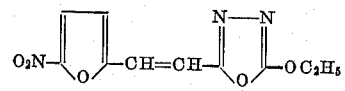

1-ethoxycarbonyl-2-[3-(5-nitro-2-furyl) acryloyl] hydrazine (2 g.) in 20 cc. of phosphorus oxychloride is heated under reflux for 4 hours. After the reaction is over, phosphorus oxychloride in excess is distilled off at a low temperature under reduced pressure. The residue is neutralized with an aqueous sodium bicarbonate solution. The unsoluble crystals are collected by filtration and washed with water. These crude crystals are recrystallized from benzene to separate out 2-[2-(5-nitro-2-furyl) vinyl]1,3,4-oxadiazoline-5-one, which is filtered off. The filtrate is condensed under reduced pressure. The remaining gummy substance is treated with ether for its crystallization and recrystallized from a mixture of tetrahydrofuran and petroleum ether to obtain yellow needle crystals of 0.1 g. of 5-[2-(5-nitro-2-furyl) vinyl]-2-ethoxy-1,3,4-oxadiazole.

*Analysis.*—Calculated for $C_{10}H_9O_5N_3$: C, 47.81; H, 3.61; N, 16.73; O, 31.85. Found: C, 47.92; H, 3.64; N, 16.46; O, 32.44.

*Example 2.—5-[2-(5-nitro-2-furyl) vinyl]-2-methoxymethyl-1,3,4-oxadiazole*

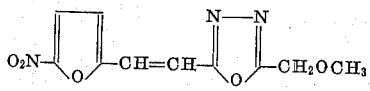

1-[3-(5-nitro-2-furyl) acryloyl]-2-methoxyacetyl-hydrazine (3.9 g.) in 39 cc. of phosphorus oxychloride is heated under reflux for 1.5 hours. After the reaction is over, phosphorus oxychloride in excess is removed under reduced pressure and further the remaining phosphorus oxychloride is decomposed by the addition of methanol and water. The precipitated crystals are collected by filtration and washed sufficiently with water. These crystals are recrystallized from water or ethanol to obtain 0.6 g. of yellow scaly crystals of 5-[2-(5-nitro-2-furyl) vinyl]-2-methoxymethyl-1,3,4-oxadiazole, M.P. 134–136° C.

Analysis.—Calculated for $C_{10}H_9O_5N_3$: C, 47.81; H, 3.61; N, 16.73. Found: C, 47.78; H, 3.59; N, 16.89.

*Example 3.—5-[2-(5-nitro-2-furyl) vinyl]-2-(4-methoxyphenyl)-1,3,4-oxadiazole*

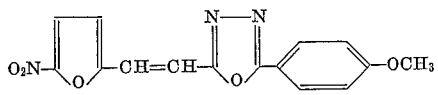

1-[3-(5-nitro-2-furyl) acryloyl]-2-(4-methoxybenzoyl)-hydrazine (2.0 g.) in 10 cc. of phosphorus oxychloride is heated under reflux for 30 minutes. After the reaction is over, phosphorus oxychloride in excess is removed and further remaining phosphorus oxychloride is decomposed by addition of methanol. Thus 1.8 g. of crystals of 5-[2-(5-nitro-2-furyl) vinyl]-2-(4-methoxyphenyl)-1,3,4-oxadiazole are collected by filtration. These crystals are recrystallized from 2-ethoxyethanol to obtain yellow faint needles, M.P. 229° C. (dec.).

Analysis.—Calculated for $C_{15}H_{11}O_5N_3$: C, 57.51; H, 3.54; N, 13.42. Found: C, 57.35; H, 3.64; N, 13.66.

*Example 4.—5-[2-(5-nitro-2-furyl) vinyl]-2-(2-furyl)-1,3,4-oxadiazole*

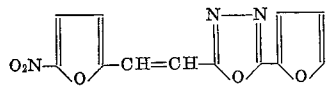

1-[3-(5-nitro-2-furyl) acryloyl]-2-(2-furyl) hydrazine (3.6 g.) in 20 cc. of phosphorus oxychloride is heated under reflux for one hour, the reaction mixture is treated as same ways as the Example 3. Thus 2.8 g. of crystals of 5-[2-(5-nitro-2-furyl) vinyl]-2-(2-furyl-1,3,4 - oxadiazole are obtained and recrystalized from 2-ethoxyethanol to obtain yellow scaly crystals, M.P. 236° C. (dec.).

Analysis.—Calculated for $C_{12}H_7O_5N_3$: C, 52.75; H, 2.58; N, 15.38. Found: C, 52.43; H, 2.67; N, 15.68.

We claim:
1. A compound having the formula:

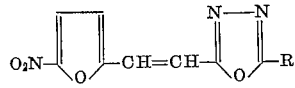

wherein R is a radical selected from the group consisting of lower alkoxy and lower alkoxy lower alkyl.

2. 5-[2-(5-nitro-2-furyl) vinyl]-2-ethoxy-1,3,4-oxadiazole.

3. 5-[2-(5-nitro-2-furyl) vinyl]-2-methoxymethyl-1,3,4-oxadiazole.

References Cited
FOREIGN PATENTS 630,163 9/1963 Belgium.
1,016 12/1961 France.

OTHER REFERENCES

Lowy et al.: "An Introduction to Organic Chemistry," 6th ed., p. 213, John Wiley and Sons (1945).

Saikawa et al.: Yakugku Zasshi, vol. 84, pp. 225–229 (March 1964).

JOHN D. RANDOLPH, *Primary Examiner.*